(12) United States Patent
Tsubone et al.

(10) Patent No.: US 12,387,603 B2
(45) Date of Patent: Aug. 12, 2025

(54) PERIPHERY RECOGNITION SUPPORT SYSTEM AND METHOD FOR OFF-ROAD VEHICLE

(71) Applicant: KAWASAKI MOTORS, LTD., Akashi (JP)

(72) Inventors: Toshiyuki Tsubone, Kobe (JP); Shuichi Miyanishi, Kobe (JP); Tokishin Nishinaka, Kobe (JP); Nobuyuki Nishiguchi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 536 days.

(21) Appl. No.: 17/372,203

(22) Filed: Jul. 9, 2021

(65) Prior Publication Data

US 2023/0011331 A1  Jan. 12, 2023

(51) Int. Cl.

| | |
|---|---|
| *G08G 1/16* | (2006.01) |
| *B60K 35/00* | (2024.01) |
| *B60K 35/10* | (2024.01) |
| *B60K 35/22* | (2024.01) |
| *B60K 35/28* | (2024.01) |
| *B60K 35/29* | (2024.01) |
| *G08G 1/052* | (2006.01) |
| *H04W 4/40* | (2018.01) |
| *H04W 4/90* | (2018.01) |

(52) U.S. Cl.
CPC ............. *G08G 1/164* (2013.01); *B60K 35/10* (2024.01); *B60K 35/22* (2024.01); *B60K 35/28* (2024.01); *B60K 35/29* (2024.01); *G08G 1/052* (2013.01); *G08G 1/166* (2013.01); *H04W 4/40* (2018.02); *H04W 4/90* (2018.02); *B60K 2360/178* (2024.01); *B60K 2360/179* (2024.01)

(58) Field of Classification Search
CPC ........ G08G 1/164; G08G 1/052; G08G 1/166; B60K 35/00; B60K 2370/178; B60K 2370/179; B60Y 2200/20; G06V 20/58; H04W 4/40; H04W 4/90
See application file for complete search history.

(56) References Cited

U.S. PATENT DOCUMENTS

| | | | |
|---|---|---|---|
| 9,499,124 B2 | 11/2016 | Kawakatsu et al. | |
| 10,109,200 B1* | 10/2018 | Delorme | B60C 23/064 |
| 10,308,115 B2 | 6/2019 | Kawakatsu et al. | |
| 10,791,183 B1* | 9/2020 | Gallagher | H04L 67/52 |
| 2016/0007156 A1* | 1/2016 | Chiou | H04W 4/022 455/456.3 |
| 2016/0180721 A1* | 6/2016 | Otulic | B60Q 9/00 701/2 |

(Continued)

FOREIGN PATENT DOCUMENTS

| | | | | |
|---|---|---|---|---|
| WO | WO-2021055646 A1 * | 3/2021 | ........... | G01C 21/005 |

*Primary Examiner* — Donald J Wallace
*Assistant Examiner* — Henry R Hinton
(74) *Attorney, Agent, or Firm* — Alleman Hall & Tuttle LLP

(57) ABSTRACT

A periphery recognition support system for an off-road vehicle includes processing circuitry. The processing circuitry is configured to: acquire position data indicating a position of a peripheral object around an off-road vehicle; determine based on the position data whether or not a predetermined warning condition is satisfied; and output a predetermined warning signal when it is determined that the warning condition is satisfied.

16 Claims, 10 Drawing Sheets

(56) References Cited

U.S. PATENT DOCUMENTS

| | | | | |
|---|---|---|---|---|
| 2018/0101998 A1* | 4/2018 | Pierce | ............... | A63B 55/60 |
| 2020/0239017 A1* | 7/2020 | Gagnon | ............... | B60W 50/14 |
| 2020/0339117 A1* | 10/2020 | Graves | ............... | G05D 1/0257 |
| 2021/0166564 A1* | 6/2021 | Takaki | ............... | G08G 1/166 |

* cited by examiner

1 …

PERIPHERY RECOGNITION SUPPORT SYSTEM AND METHOD FOR OFF-ROAD VEHICLE

BACKGROUND OF THE INVENTION

Field of the Invention

The present disclosure relates to a system and method of supporting periphery recognition of an off-road vehicle.

Description of the Related Art

Off-road vehicles (utility vehicles) that travel on land, such as waste land and largely uneven deserts, are known. Since the off-road vehicle freely travels off-road, i.e., travels an area where there are no definite roads, the off-road vehicle can approach a peripheral object (for example, another off-road vehicle) from any direction. Moreover, largely uneven land may block visual observation of another vehicle by a driver of an own vehicle.

SUMMARY OF THE INVENTION

A periphery recognition support system for an off-road vehicle according to one aspect of the present disclosure includes processing circuitry. The processing circuitry is configured to: acquire position data indicating a position of a peripheral object around an off-road vehicle; determine based on the position data whether or not a predetermined warning condition is satisfied; and output a predetermined warning signal when it is determined that the warning condition is satisfied.

A periphery recognition support method for an off-road vehicle according to another aspect of the present disclosure includes: receiving position data by processing circuitry, the position data including position coordinates of a peripheral object around an off-road vehicle; determining by the processing circuitry based on the position coordinates of the peripheral object and the position coordinates of the off-road vehicle whether or not a predetermined warning condition is satisfied; and when it is determined that the warning condition is satisfied, outputting a warning signal by the processing circuitry based on the position coordinates of the peripheral object, the warning signal including an instruction of controlling the off-road vehicle.

A periphery recognition support method for an off-road vehicle according to yet another aspect of the present disclosure includes: receiving position data by processing circuitry, the position data indicating a position of an object around an off-road vehicle; determining by the processing circuitry based on the position data whether or not a predetermined warning condition is satisfied; and when it is determined that the warning condition is satisfied, outputting a predetermined warning signal by the processing circuitry.

DESCRIPTION OF THE PREFERRED EMBODIMENTS

Hereinafter, an embodiment will be described with reference to the drawings.

Figure 1:
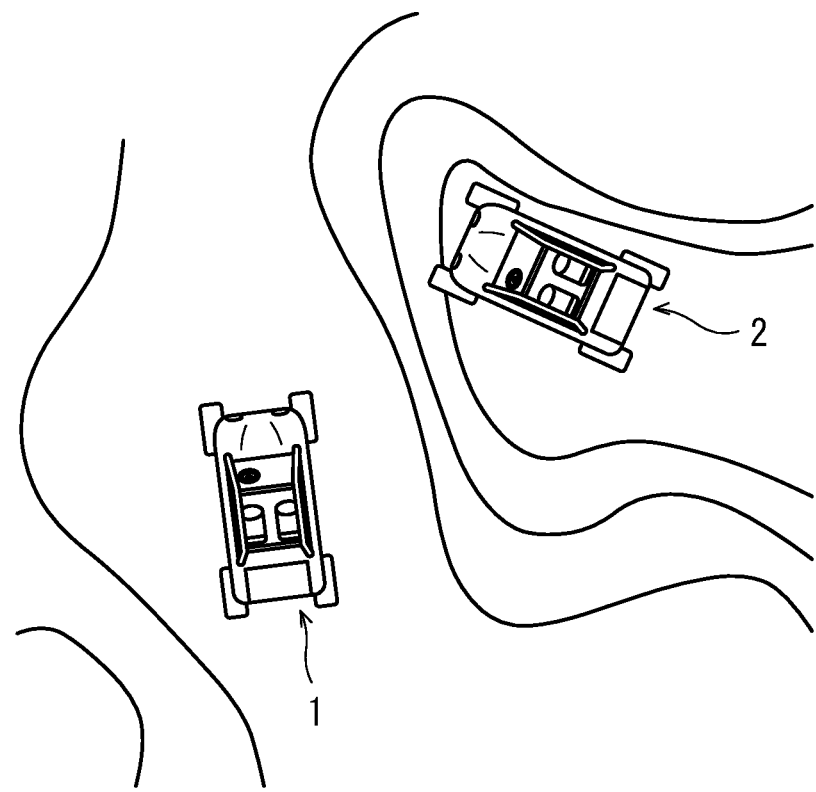
FIG. 1 is a plan view showing an off-road vehicle traveling irregular ground and its periphery when viewed from above.
Figure 2:
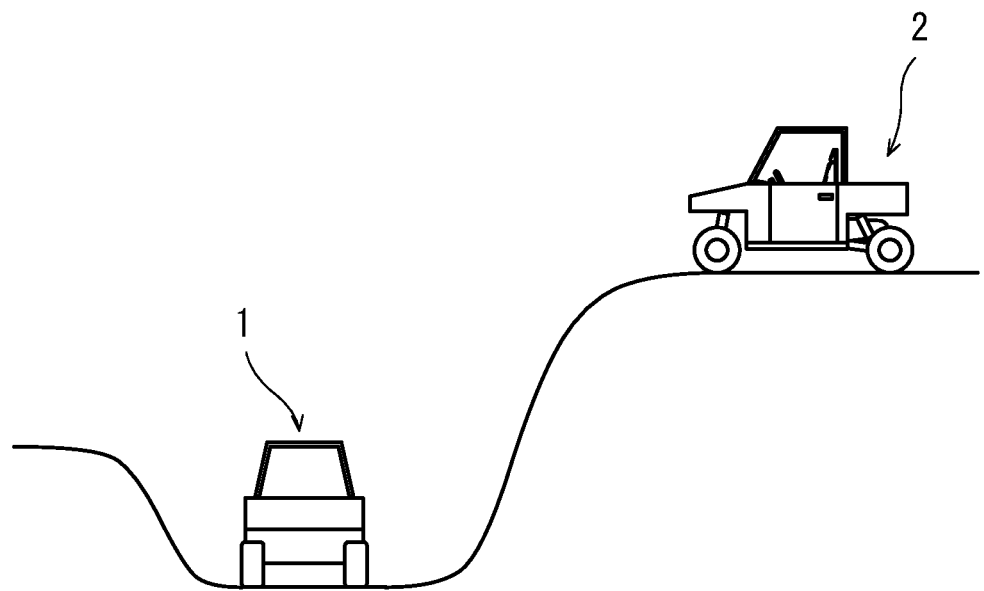
FIG. 2 is a diagram showing the off-road vehicle of FIG. 1 and its periphery when viewed from a horizontal direction.

FIG. 1 is a plan view showing an off-road vehicle 1 traveling irregular ground and its periphery when viewed from above. FIG. 2 is a diagram showing the off-road vehicle 1 of FIG. 1 and its periphery when viewed from a horizontal direction. FIG. 1 shows contour lines of land. As shown in FIG. 1, the off-road vehicle 1 freely travels irregular ground (for example, a largely uneven rocky area) where there are no definite roads. Therefore, the off-road vehicle 1 may approach a peripheral object around the off-road vehicle 1 from any direction. However, the largely uneven land may block confirmation of the peripheral object by a driver of the off-road vehicle 1. For example, as shown in FIG. 2, when the off-road vehicle 1 travels an area below a cliff, and an off-road vehicle 2 travels a nearby area above the cliff, the visual fields of the drivers of the vehicles 1 and 2 are blocked by the cliff, rocks, and the like, and therefore, the vehicles 1 and 2 may unconsciously approach each other.

Examples of the peripheral object may include movable bodies, such as the off-road vehicle 2, and fixed objects. Examples of the peripheral object may include not only tangible objects but also intangible objects. Examples of the peripheral object may include: other vehicles, such as the off-road vehicle 2; obstacles; regulated areas; and virtual outer edges of travelable areas.

Figure 3:
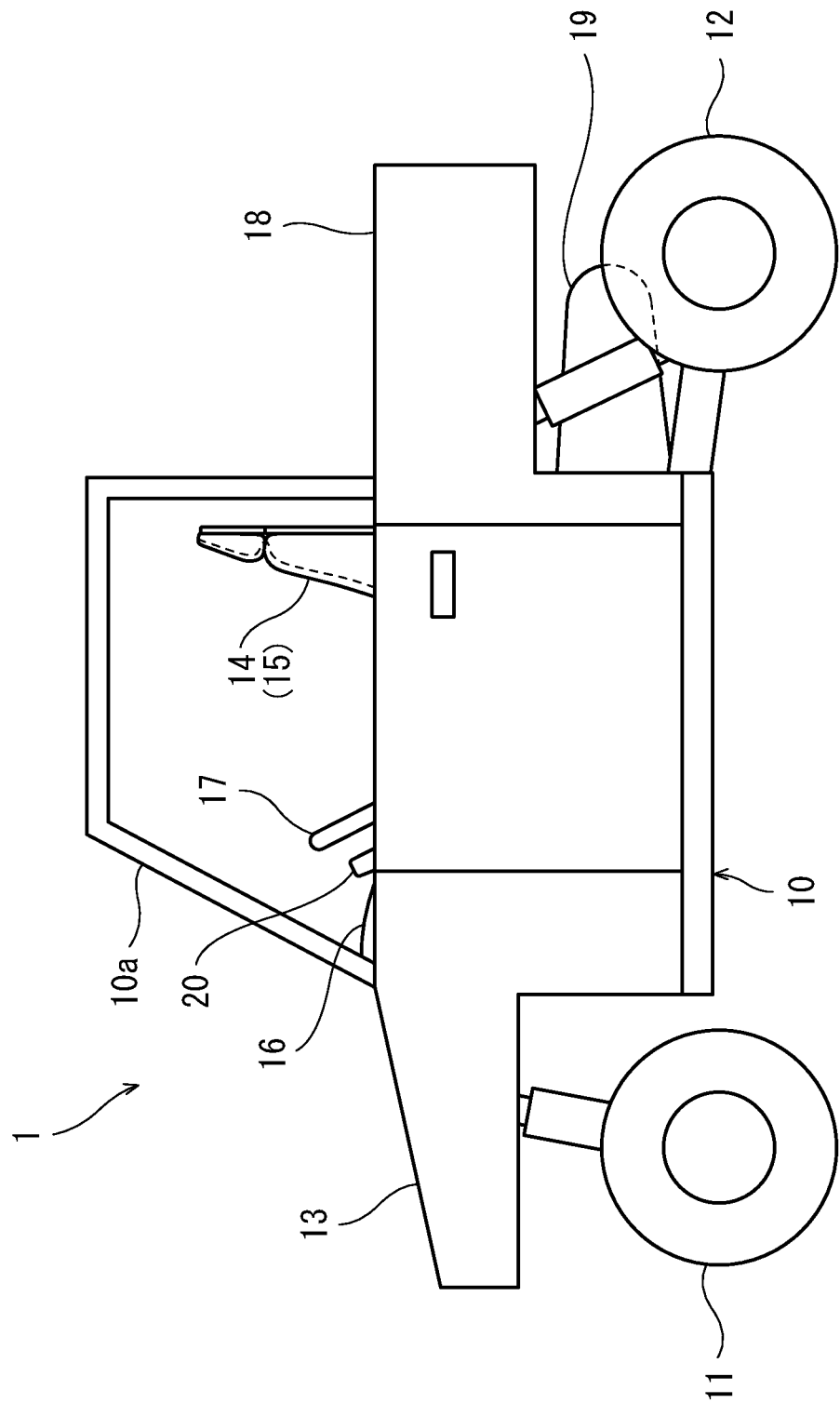
FIG. 3 is a side view of the off-road vehicle.

FIG. 3 is a side view of the off-road vehicle 1. The off-road vehicle 1 may be called a utility vehicle. As shown in FIG. 3, the off-road vehicle 1 includes a vehicle body frame 10, a pair of left and right front wheels 11 supporting a front portion of the vehicle body frame 10, and a pair of left and right rear wheels 12 supporting a rear portion of the vehicle body frame 10. Tires of the front wheels 11 and the rear wheels 12 are balloon tires for irregular ground traveling. A space between the left and right front wheels 11 is covered with a hood 13 from above. A driver's seat 14 and a front passenger seat 15 which are supported by the vehicle body frame 10 are disposed behind the hood 13.

The vehicle body frame 10 is a pipe frame formed by connecting pipes. The vehicle body frame 10 includes, for example, a cabin frame 10a surrounding an interior space where the driver's seat 14 and the front passenger seat 15 are disposed. The interior space surrounded by the cabin frame 10a is exposed to an outside. A dash panel 16 is disposed in front of the driver's seat 14 and the front passenger seat 15. A handle 17 is disposed at the dash panel 16 so as to project toward the driver's seat 14. A steering angle of the handle 17 may be detected by a steering angle sensor.

The vehicle body frame 10 supports a cargo bed 18 that is located behind the cabin frame 10a and defines a hollow loading space that is open to an outside. A power unit 19 is mounted on the vehicle body frame 10 so as to be located under the cargo bed 18. The power unit 19 includes, as a prime mover, an internal combustion engine, an electric motor, or a combination of an internal combustion engine and an electric motor and may include a transmission. The power unit 19 outputs rotational power that drives the front wheels 11 and/or the rear wheels 12.

A below-described periphery recognition support unit 20 is disposed at the dash panel 16. Each of other off-road vehicles, such as the off-road vehicle 2, may have a similar configuration to the off-road vehicle 1.

Figure 4:
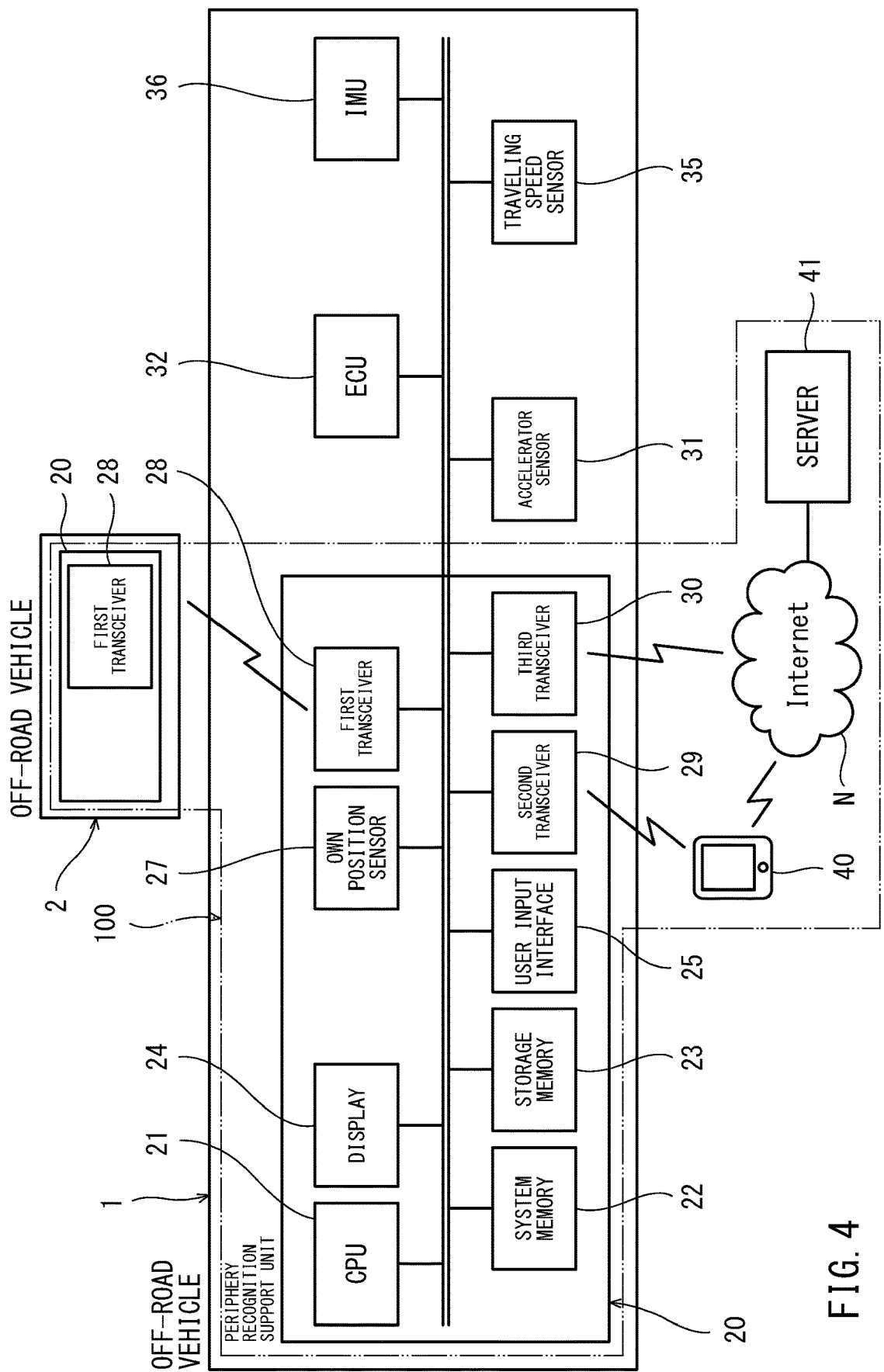
FIG. 4 is a block diagram of a periphery recognition support system.

FIG. 4 is a block diagram of a periphery recognition support system 100. As shown in FIG. 4, the periphery recognition support system 100 includes the periphery recognition support unit 20. The periphery recognition support unit 20 includes: at least one memory that stores a periphery recognition support program; and at least one processor that can execute the periphery recognition support program. Specifically, the periphery recognition support unit 20 includes a CPU 21, a system memory 22, a storage memory 23, a display 24, a user input interface 25, an own position sensor 27, a first transceiver 28, a second transceiver 29, a third transceiver 30, and the like.

The CPU 21 is a central processing unit. The system memory 22 may include a RAM. The storage memory 23 may include a ROM. The ROM stores identification information of the vehicle 1. The storage memory 23 may include, for example, a hard disk and/or a flash memory. The storage memory 23 stores the periphery recognition support program. A configuration in which the CPU 21 executes the periphery recognition support program read by the system memory 22 is one example of processing circuitry.

The display 24 is a type of user output interface. The display 24 may be a display device, such as a liquid crystal display, an organic EL display, or an AR (Augmented Reality) display, which displays a warning image for the driver. The user output interface may be a speaker that outputs warning sound for the driver. The user input interface 25 is an interface through which information manipulated by a user is input to the CPU 21. The user input interface 25 may be a touch panel of the display 24 or may be a manipulation element, such as a button or a lever, which is arranged separately from the display.

The own position sensor 27 is a sensor that detects current position coordinates of the off-road vehicle 1. The own position sensor 27 may be a satellite positioning sensor, such as a GPS sensor. The position coordinates may be three-dimensional position coordinates. The current position coordinates of the off-road vehicle 1 may be obtained by calculation based on a movement distance calculated from a traveling speed detected by a below-described traveling speed sensor 35 and a movement direction calculated from acceleration detected by a below-described IMU 36.

The first transceiver 28 performs wireless communication directly with the first transceivers 28 of the other off-road vehicles, such as the off-road vehicle 2, and communication devices similar to those, without through a base station. The first transceiver 28 may perform wireless communication by, for example, RF (Radio Frequency) communication.

The first transceiver 28 may perform communication in accordance with a standard defined by MURS (Multi-Use Radio Service). The first transceiver 28 may have power restriction of two watts and transmit and receive a radio wave in a narrow selected range of a VHF band. The first transceiver 28 can transmit and receive the radio wave to and from the first transceivers 28 corresponding to the similar communication standard to realize bidirectional wireless communication. For example, the first transceiver 28 may modulate driver voice information collected by a microphone of the first transceiver 28, give the modulated information to the propagated radio wave, and transmit the radio wave through an antenna to a periphery. The first transceiver 28 may output, from a speaker thereof, voice information obtained by demodulating the propagated radio wave received from the antenna. With this, two off-road vehicles within a VHF radio wave reception range can perform bidirectional voice call.

The first transceiver 28 may perform bidirectional communication by modulating and demodulating information other than voice. The first transceiver 28 can give position information, detected by the own position sensor 27, to the propagated radio wave and transmit the propagated radio wave to the off-road vehicle 2. In other words, the CPU 21 of the periphery recognition support unit 20 can acquire the position information of the off-road vehicle 2 through the first transceiver 28. The first transceiver 28 may give the identification information, set for the individual periphery recognition support unit 20, to the propagated radio wave and transmit the radio wave to the off-road vehicle 2.

A radio wave transmission/reception range between the first transceivers 28 is set larger than a radio wave transmission/reception range between the below-described second transceivers 29. For example, the radio wave transmission/reception range between the first transceivers 28 may be set to one mile or less.

A wireless communication range of the first transceiver 28 is one example, and the other communication standards and the other communication frequencies may be used. To be specific, a transceiver of an own vehicle and a transceiver of another vehicle may perform bidirectional transmission/reception in accordance with a common communication system.

The second transceiver 29 performs wireless communication directly with mobile information terminals 40, such as smartphones and smart watches, without through the base station. The second transceiver 29 may perform wireless communication with the mobile information terminals 40 by a near field communication, such as Bluetooth or Wi-Fi. A radio wave transmission/reception range of the second transceiver 29 is set to, for example, less than 10 meters. The second transceiver 29 performs radio wave transmission and reception with the mobile information terminal 40, and with this, can determine that the mobile information terminal 40 exists within the radio wave transmission/reception range.

The mobile information terminal 40 includes a processor and a memory. The mobile information terminal 40 is disposed at the off-road vehicle 1 or carried by the driver of the off-road vehicle 1 so as to move together with the off-road vehicle 1. The mobile information terminal 40 is wirelessly connected to a public line network N, such as the Internet, through a base station antenna that is a fixed facility and can communicate with a server 41. The server 41 includes a processor and a memory.

The third transceiver 30 is wirelessly connected to the network N, such as the Internet, through the base station antenna as the fixed facility and a public line and can communicate with the server 41. To be specific, the periphery recognition support unit 20 may be connected to the network N through the mobile information terminal 40 or may be directly connected to the network N by the third transceiver 30. The third transceiver 30 may be formed so as to be able to perform radio wave transmission and reception with an artificial satellite. With this, even when the periphery recognition support unit 20 is located outside a radio wave transmission/reception range of the base station antenna that is the fixed facility, the third transceiver 30 can be connected to the network N. The second transceiver 29 and the third transceiver 30 may be omitted, and the first transceiver 28 may perform communication. The first transceiver 28 and the third transceiver 30 may be omitted, and the second transceiver 29 may perform communication. The first transceiver 28 and the second transceiver 29 may be omitted, and the third transceiver 30 may perform communication.

In addition to the periphery recognition support unit 20, the off-road vehicle 1 includes an accelerator sensor 31, an ECU (Electronic Control Unit) 32, the traveling speed sensor 35, the IMU 36, and the like. The accelerator sensor 31 detects a required acceleration amount of the driver of the off-road vehicle 1. The accelerator sensor 31 detects, for example, an operation amount of an accelerator pedal. The ECU 32 is a prime mover controller that controls a prime mover E in accordance with the detected value of the accelerator sensor 31. The ECU 32 includes a processor and a memory. The accelerator sensor 31, the ECU 32, the traveling speed sensor 35, the IMU 36, and the like are connected to each other through a CAN (Controller Area Network) communication line, and the periphery recognition support unit 20 is connected to the CAN communication line. The off-road vehicle 1 may include a communication connecting terminal by which the periphery recognition support unit 20 and the ECU 32 are electrically connected to each other, a power supply connecting terminal by which electric power is supplied to the periphery recognition support unit 20, or a combination thereof. The communication connecting terminal and the power supply connecting terminal may be integrated with each other.

The traveling speed sensor 35 detects the traveling speed of the off-road vehicle 1. The IMU 36 is an inertial measurement unit. The IMU 36 includes a triaxial gyro and a three-direction accelerometer and detects a three-dimensional angular speed and a three-dimensional acceleration. In other words, the IMU 36 detects angular speeds around three axes orthogonal to each other in the off-road vehicle 1 and accelerations in directions along the three axes.

Figure 5:
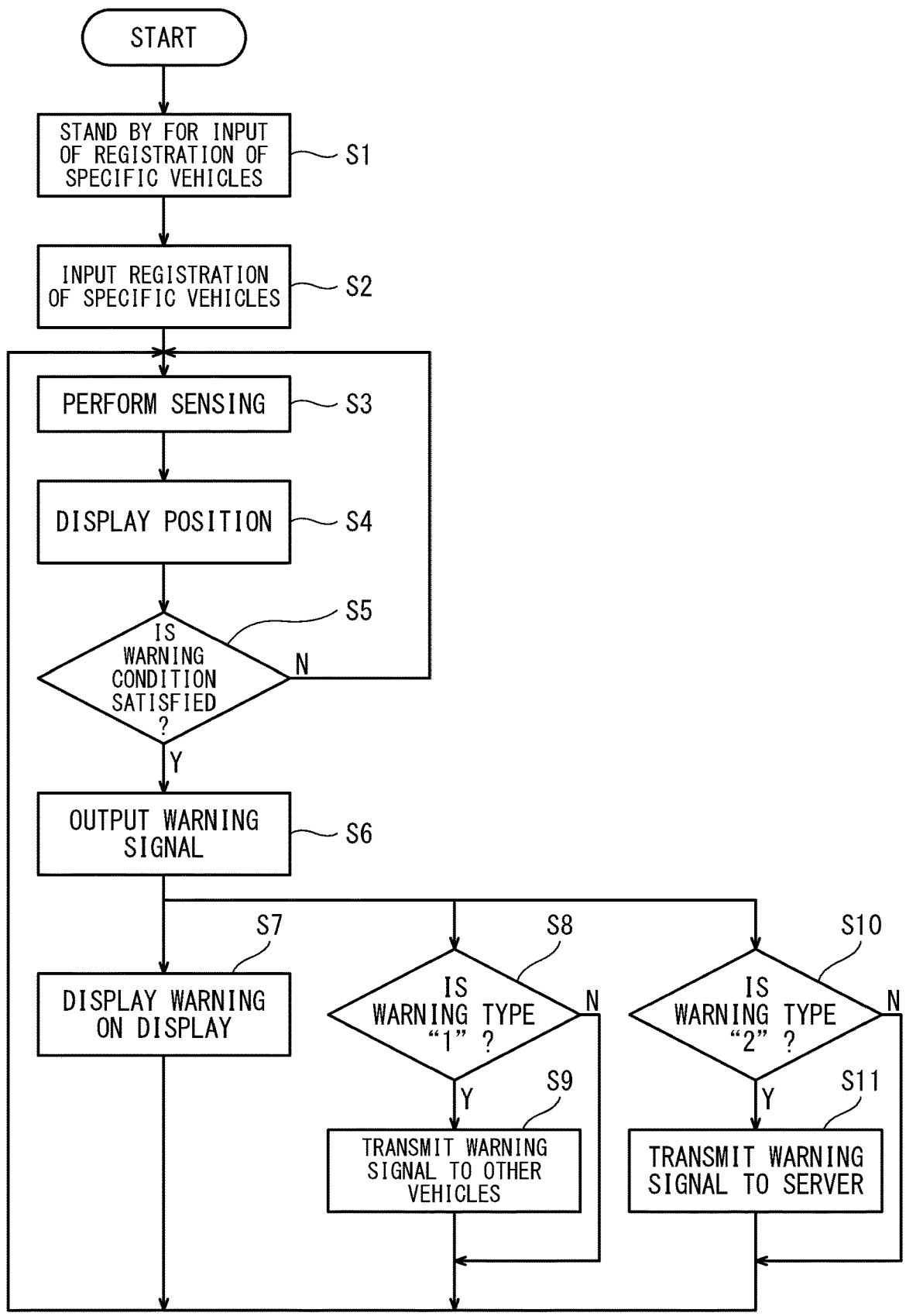
FIG. 5 is a flow chart showing main processing performed by the periphery recognition support system shown in FIG. 4.

FIG. 5 is a flow chart showing main processing performed by the periphery recognition support system 100 shown in FIG. 4. In the periphery recognition support system 100, mainly, the CPU 21 executes commands of the periphery recognition support program in the periphery recognition support unit 20 to perform the following processing. The following will be described based on the flow of FIG. 5 with suitable reference to FIG. 4 and the like. The following will mainly describe an example in which the peripheral object is the off-road vehicle 2. However, the peripheral object may be another object.

As shown in FIG. 5, the CPU 21 displays a user input screen image on the display 24 in accordance with a predetermined input manipulation and stands by for a user's input of an instruction of registering one or more other off-road vehicles as specific vehicles (Step S1). The user manipulates the user input interface 25 of the periphery recognition support unit 20 to input the registration of the specific vehicle (Step S2). The CPU 21 stores information of the registered specific vehicle in the storage memory 23. Steps S1 and S2 may be executed at any timings requested by the user. Steps S1 and S2 may be omitted.

The registration of the specific vehicle may be realized by bidirectional transmission/reception between the first transceivers 28. The CPU 21 may receive information, such as position information, a proceeding direction, and a movement speed of the vehicle 2, together with the identification information of the vehicle 2 through the first transceiver 28. For example, in Step S1, the CPU 21 may display on the display 24 the position information of the vehicle 2 acquired through the first transceiver 28. The user of the vehicle 1 determines based on the position and identification information of the vehicle 2 displayed on the display 24 whether or not the vehicle 2 should be registered. The user of the vehicle 1 refers to the display 24, selects the vehicle 2 to be registered through the user input interface 25, and instructs the CPU 21. The CPU 21 stores in the storage memory 23 the identification information indicating the vehicle 2 selected by the user, as the identification information indicating the vehicle to be specified.

Regarding Steps S1 and S2, the periphery recognition support unit 20 may receive the user's input such that the specific vehicles can be registered by being divided into groups, and may store the specific vehicles in the storage memory 23 by associating the specific vehicles with the corresponding groups. The periphery recognition support unit 20 may receive the user's input such that the specific vehicles can be registered by being divided into levels, and may store the specific vehicles in the storage memory 23 by associating the specific vehicles with the corresponding levels. When the CPU 21 displays the user input screen image on the display 24, the CPU 21 may receive the user's input of an instruction of registering a communication device of a vehicle other than the off-road vehicle, a communication device of a specific user, a communication device of a predetermined manager, or the like as a specific communication target and may store the specific communication target in the storage memory 23.

When the off-road vehicle 1 is in a travelable state, such as an idling state, or while the off-road vehicle 1 is traveling, the off-road vehicle 1 performs sensing of the peripheral object around the off-road vehicle 1 (Step S3). Specifically, the periphery recognition support unit 20 receives object position data indicting position coordinates of the off-road vehicle 2 that is the peripheral object. When the off-road vehicle 2 detects its own position coordinates, the periphery recognition support unit 20 of the off-road vehicle 1 receives the object position data indicating the position coordinates of the off-road vehicle 2, from the off-road vehicle 2 through the first transceiver 28. The position coordinates may be three-dimensional position coordinates. The off-road vehicle 2 detects the position coordinates (latitude, longitude, and altitude) of the off-road vehicle 2 by satellite positioning. The periphery recognition support unit 20 of the off-road vehicle 1 receives own position data indicating the position coordinates of the off-road vehicle 1, from the own position sensor 27. The CPU 21 calculates, as an object distance, a distance between the position coordinates of the off-road vehicle 1 and the position coordinates of the off-road vehicle 2.

The CPU 21 acquires the speed of the off-road vehicle 1 from the traveling speed sensor 35. The CPU 21 may calculate the speed of the off-road vehicle 1 based on a change amount of the position coordinates of the off-road vehicle 1. The CPU 21 receives information of the speed of the off-road vehicle 2 from the first transceiver 28 of the off-road vehicle 2. The CPU 21 may calculate the speed of the off-road vehicle 2 based on a change amount of the position coordinates of the off-road vehicle 2. The CPU 21 calculates a relative speed between the off-road vehicle 1 and the off-road vehicle 2 based on the speed of the off-road vehicle 1 and the speed of the off-road vehicle 2.

The CPU 21 calculates a movement direction of the off-road vehicle 1 based on a most recent movement trajectory of the position coordinates of the off-road vehicle 1. The CPU 21 calculates a movement direction of the off-road vehicle 2 based on a most recent movement trajectory of the position coordinates of the off-road vehicle 2. The periphery recognition support unit 20 may receive data indicating the movement direction of the off-road vehicle 2, from the first transceiver 28 of the off-road vehicle 2. The CPU 21 may calculate a relative movement direction between the off-road vehicle 1 and the off-road vehicle 2 based on the movement direction of the off-road vehicle 1 and the movement direction of the off-road vehicle 2.

The periphery recognition support unit 20 may acquire the speed and movement direction of the off-road vehicle 1 and the speed and movement direction of the off-road vehicle 2 in such a manner that a configuration realized by executing the periphery recognition support program by the CPU 21 calculates the speed and movement direction of the off-road vehicle 1 and the speed and movement direction of the off-road vehicle 2. However, the periphery recognition support unit 20 may acquire such information by receiving the information from the off-road vehicle 2 or the server 41. The periphery recognition support unit 20 may acquire the relative speed between the off-road vehicle 1 and the off-road vehicle 2 in such a manner that the configuration realized by executing the periphery recognition support program by the CPU 21 calculates the relative speed between the off-road vehicle 1 and the off-road vehicle 2 based on the speed of the off-road vehicle 1 and the speed of the off-road vehicle 2. However, the periphery recognition support unit 20 may acquire the relative speed between the off-road vehicle 1 and the off-road vehicle 2 by receiving the relative speed from the off-road vehicle 2 or the server 41. The periphery recognition support unit 20 may acquire the relative movement direction between the off-road vehicle 1 and the off-road vehicle 2 in such a manner that the configuration realized by executing the periphery recognition support program by the CPU 21 calculates the relative movement direction between the off-road vehicle 1 and the off-road vehicle 2 based on the movement direction of the off-road vehicle 1 and the movement direction of the off-road vehicle 2. However, the periphery recognition support unit 20 may acquire the relative movement direction between the off-road vehicle 1 and the off-road vehicle 2 by receiving the relative movement direction from the off-road vehicle 2 or the server 41.

The peripheral object does not have to be a tangible object, such as the off-road vehicle 2, and may be an intangible object, such as a predetermined regulated area. The regulated area may be, for example, a speed restricted area, a travel prohibited area, a user setting area, or the like. A position coordinate range of the regulated area or the like may be stored in the storage memory 23 in advance, may be received from the server 41 through the network N, or may be determined by calculation.

Figure 6:
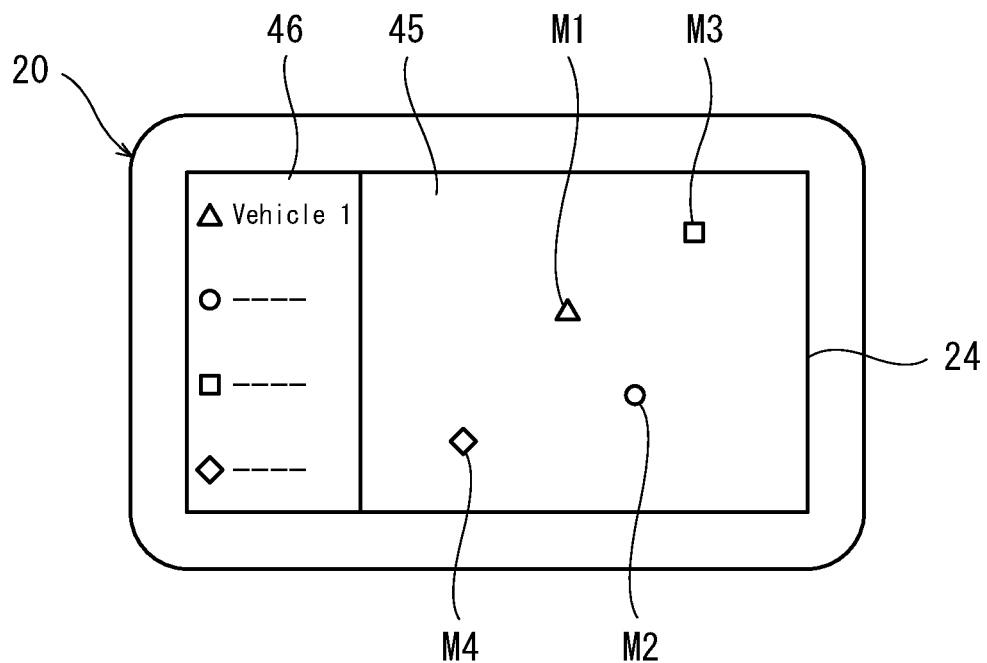
FIG. 6 is a diagram showing a display screen image of a periphery recognition support unit shown in FIG. 4.

The CPU 21 displays the position of the peripheral object, such as the off-road vehicle 2, on the display 24 (Step S4). As shown in FIG. 6, the display screen image displayed on the display 24 of the periphery recognition support unit 20 includes a map screen image 45 and a list screen image 46. In the example shown in FIG. 6, the peripheral objects are other off-road vehicles. The map screen image 45 displays, on a map, an own mark M1 indicating the position of the off-road vehicle 1 and object marks M2 to M4 indicating the positions of the other off-road vehicles. The driver of the off-road vehicle 1 can see the map screen image 45 to recognize the positional relation among the off-road vehicle 1 and the other off-road vehicles.

The list screen image 46 displays, for example, a relation between the marks M2 to M4 of the specific vehicles registered to the same group as the off-road vehicle 1 and attribute information such as user names of the marks M2 to M4. The driver of the off-road vehicle 1 can refer to the map screen image 45 and the list screen image 46 to recognize the positions of members belonging to the same group as the driver of the off-road vehicle 1.

Referring back to FIG. 5, the CPU 21 determines whether or not the position data of the off-road vehicle 2 that is the peripheral object satisfies a predetermined warning condition (Step S5). The warning condition is determined based on the position coordinates of the off-road vehicle 2 and the position coordinates of the off-road vehicle 1. The warning condition includes a condition that the position data of the off-road vehicle 1 and the position data of the off-road vehicle 2 indicate current or future approach between the off-road vehicle 1 and the off-road vehicle 2. Specifically, the warning condition includes a condition that the object distance correlated to the distance between the off-road vehicle 1 and the off-road vehicle 2 is less than a predetermined threshold.

Figure 7:
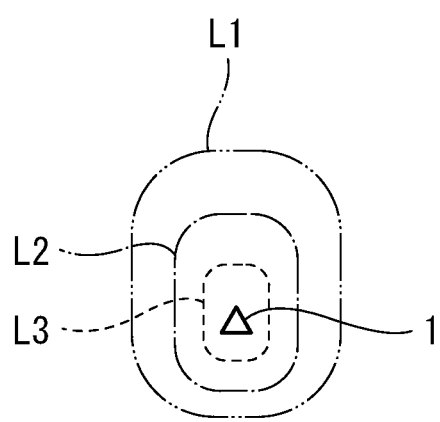
FIG. 7 is a schematic diagram for explaining a warning condition when the off-road vehicle is idling.
Figure 8:
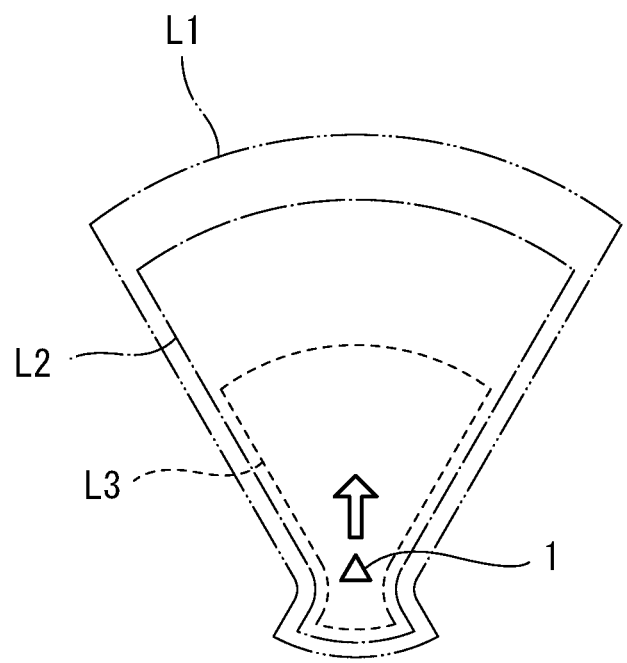
FIG. 8 is a schematic diagram for explaining the warning condition when the off-road vehicle is traveling linearly.
Figure 9:
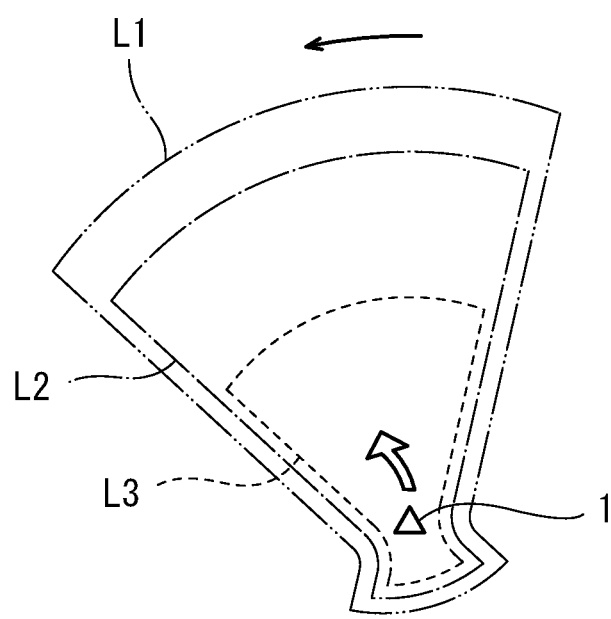
FIG. 9 is a schematic diagram for explaining the warning condition when the off-road vehicle is turning.

FIG. 7 is a schematic diagram for explaining the warning condition when the off-road vehicle 1 is idling. FIG. 8 is a schematic diagram for explaining the warning condition when the off-road vehicle 1 is traveling linearly. FIG. 9 is a schematic diagram for explaining the warning condition when the off-road vehicle 1 is turning. As shown in FIGS. 7 to 9, the condition that the object distance is less than the threshold may include a condition that the off-road vehicle 2 exists in a warning region of a predetermined range based on the off-road vehicle 1. To be specific, an outer edge of the warning region may correspond to the threshold. To make the warning condition easily satisfied, the threshold of the object distance may be increased by expanding the warning region.

When the position coordinates are three-dimensional position coordinates, and a difference between the height of the off-road vehicle 1 and the height of the off-road vehicle 2 exceeds a predetermined value, the warning condition does not have to be satisfied. When the position coordinates are three-dimensional position coordinates, and the height of the off-road vehicle 2 is larger than the height of the off-road vehicle 1, the warning condition may be satisfied in consideration that the off-road vehicle 2 may approach the off-road vehicle 1 from above.

The warning condition may differ depending on the type of the peripheral object. For example, the threshold of the object distance may be set so as to differ depending on the type of the peripheral object. For example, when the peripheral object is a movable object, such as the off-road vehicle 2, the warning condition may be set so as to be more easily satisfied than when the peripheral object is an immovable, fixed object. To make the warning condition easily satisfied, a warning range may be enlarged as an expected movement speed of the movable object increases. A determination frequency per unit time of the warning condition directed to the movable object may be set higher than a determination frequency per unit time of the warning condition directed to the fixed object.

At least one warning region may include warning regions set stepwisely for respective types of warning targets. For example, the warning regions include a warning region L1 in which the warning targets are the other off-road vehicles, a warning region L2 in which the warning targets are the fixed objects, and a warning region L3 in which the warning targets are humans. Each of the warning regions L1 to L3 has such a shape that a part thereof in front of the off-road vehicle 1 is larger than a part thereof behind the off-road vehicle 1.

As shown in FIGS. 7 and 8, each of the warning regions L1 to L3 at the time of the traveling may have a shape, such as a fan shape in plan view, which has a wider angle in a front direction than each of the warning regions L1 to L3 at the time of the travelable state, such as the idling state. In other words, each of the warning regions L1 to L3 at the time of the travelable state, such as the idling state, may have a shape closer to a circular shape or a rectangular shape in plan view than each of the warning regions L1 to L3 at the time of the traveling. At the time of the traveling, a part of each of the warning regions L1 to L3 which part is located just beside the off-road vehicle 1 may be made the smallest.

As shown in FIG. 8, a part of each of the warning regions L1 to L3 which part is located in the proceeding direction when viewed from the off-road vehicle 1 is larger than parts of each of the warning regions L1 to L3 other than the part of each of the warning regions L1 to L3 which part is located in the proceeding direction when viewed from the off-road vehicle 1. The warning regions L1 to L3 may change so as to become large as the speed of the off-road vehicle 1 increases. The warning regions L1 to L3 may become large in the front direction of the off-road vehicle 1 as a forward speed of the off-road vehicle 1 increases. The warning regions L1 to L3 may become large in the rear direction of the off-road vehicle 1 as a backward speed of the off-road vehicle 1 increases. The warning regions L1 to L3 may become small in the rear direction of the off-road vehicle 1 as the forward speed of the off-road vehicle 1 increases. The warning regions L1 to L3 may become small in the front direction of the off-road vehicle 1 as the backward speed of the off-road vehicle 1 increases.

As shown in FIG. 9, the angular displacement of the warning regions L1 to L3 may be performed in the horizontal direction based on the off-road vehicle 1 in accordance with a change in the traveling direction of the off-road vehicle 1. The angular displacement of the warning regions L1 to L3 may be performed in a steering direction based on the off-road vehicle 1 in accordance with the steering angle of the off-road vehicle 1. The angular displacement of the warning regions L1 to L3 may increase as the steering angle of the off-road vehicle 1 increases.

When it is determined that the warning condition is not satisfied (No in Step S5), the sensing is continued (Step S3).

When it is determined that the warning condition is satisfied (Yes in Step S5), the CPU 21 outputs a warning signal (Step S6). A destination to which the warning signal is output may be the display 24, the ECU 32, the specific vehicle, the server 41, or the like. The warning signal may include object position information indicating the position of the peripheral object that has satisfied the warning condition, the identification information of the peripheral object that has satisfied the warning condition, identification information of an output source from which the warning signal is output, information regarding a warning type, or any combination thereof.

Figure 10:
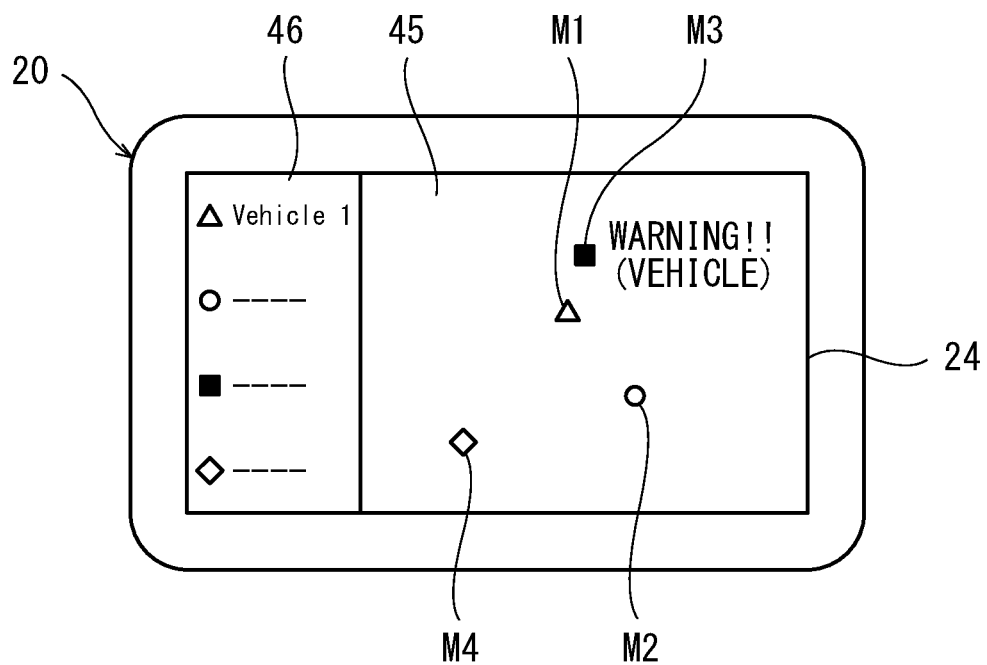
FIG. 10 is a diagram showing a first example of the display screen image at the time of warning in the periphery recognition support unit shown in FIG. 4.

FIG. 10 is a diagram showing a first example of the display screen image at the time of warning in the periphery recognition support unit 20 shown in FIG. 4. As shown in FIG. 10, the display 24 that has received the warning signal displays warning information that is recognizable by the user who is driving (Step S7). For example, the display 24 displays the object mark M3 indicating the peripheral object that has satisfied the warning condition, as a warning display image that is different from a normal display image. The warning display image that is different from the normal display image may be an emphasized display image. The object mark M3 indicating the peripheral object that has satisfied the warning condition may be displayed as, for example, a flashing display image, a color change display image, an enlarged display image, a luminance change display image, or any combination thereof.

FIG. 10 shows an example in which the peripheral object that has satisfied the warning condition is another off-road vehicle, and the mark M3 indicating the another off-road vehicle is shown as the emphasized display image. The warning display image may change in accordance with the distance between the peripheral object in the warning region and the off-road vehicle 1. For example, as the peripheral object that has entered the warning region further approaches the off-road vehicle 1, the degree of emphasis of the warning display image may be increased continuously or stepwisely.

Figure 11:
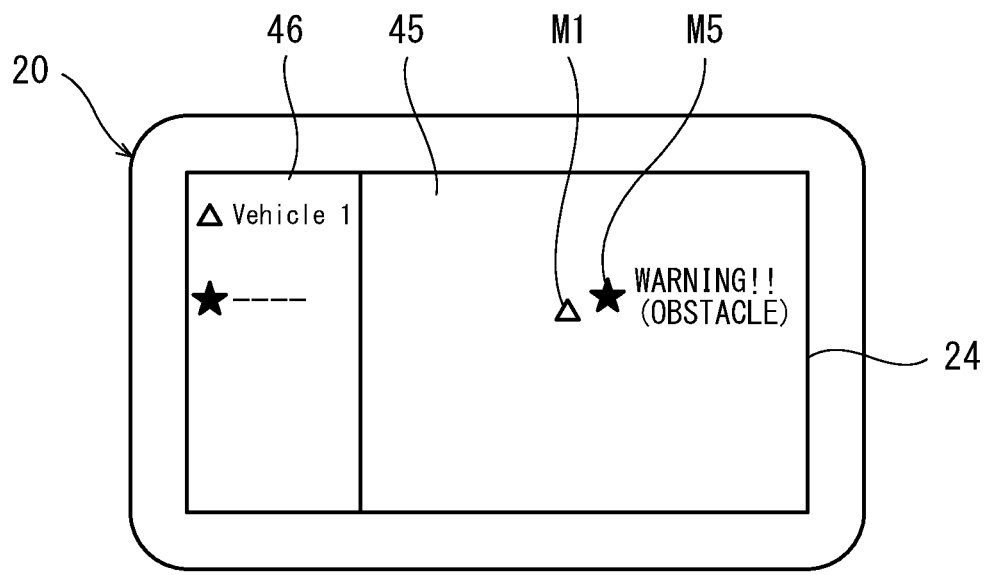
FIG. 11 is a diagram showing a second example of the display screen image at the time of the warning in the periphery recognition support unit shown in FIG. 4.

FIG. 11 is a diagram showing a second example of the display screen image at the time of the warning in the periphery recognition support unit 20 shown in FIG. 4. FIG. 11 shows an example in which the peripheral object that has satisfied the warning condition is an immovable obstacle, and the mark M5 indicating the obstacle is shown as the emphasized display image. The warning display image when the obstacle has satisfied the warning condition is different from the warning display image when the off-road vehicle has satisfied the warning condition.

Figure 12:
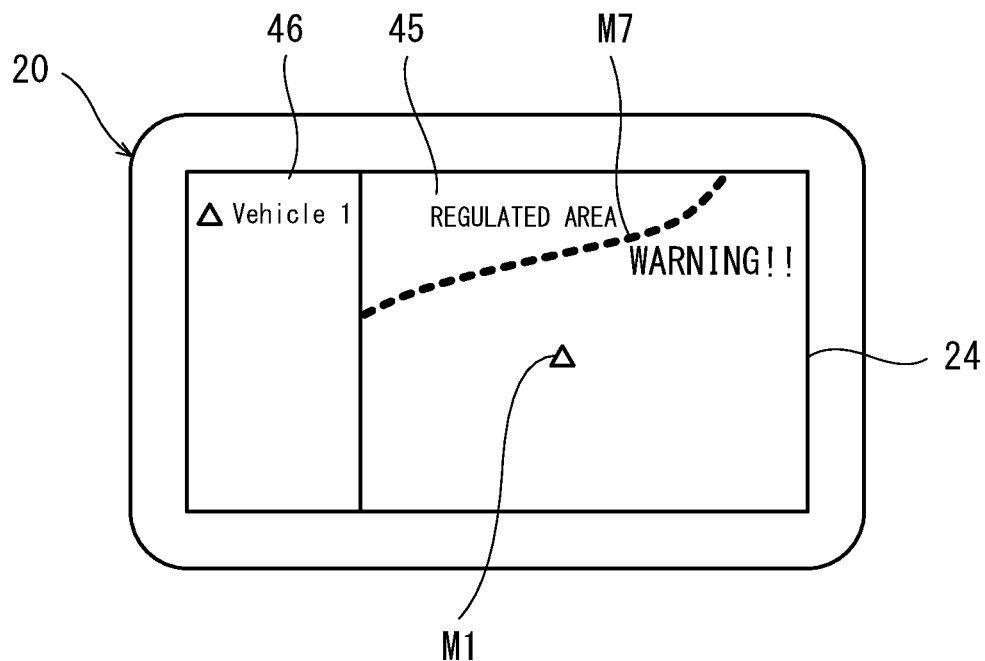
FIG. 12 is a diagram showing a third example of the display screen image at the time of the warning in the periphery recognition support unit shown in FIG. 4.

FIG. 12 is a diagram showing a fourth example of the display screen image at the time of the warning in the periphery recognition support unit 20 shown in FIG. 4. As shown in FIG. 12, when the off-road vehicle 1 approaches the regulated area, the distance from the off-road vehicle 1 to a profile line of the regulated area becomes short. When the profile line of the regulated area enters the warning range L2 (FIG. 8) based on the off-road vehicle 1, the display 24 displays, as the warning, a mark M7 indicating the regulated area.

As shown in FIGS. 10 to 12, the periphery recognition support unit 20 may change the warning display image in accordance with the type of the peripheral object that has satisfied the warning condition. As long as the types of the peripheral objects that have satisfied the warning condition can be identified, the display images may be distinguished by shapes, texts, or symbols of the marks M3, M5, and M8. The periphery recognition support unit 20 may change the warning display image in accordance with whether the peripheral object that has satisfied the warning condition is the movable object or the fixed object. The degree of emphasis of the warning display image when the peripheral object that has satisfied the warning condition is the movable object may be higher than that of the warning display image when the peripheral object that has satisfied the warning condition is the fixed object.

The output of the warning information that is recognizable by the user who is driving is not limited to visual output and may be auditory output or tactile output. A user interface that performs the auditory output is, for example, a speaker. A user interface that performs the tactile output is, for example, a vibrator. After the warning information is output to the user as above, the process returns to Step S3.

The warning signal may also be output to other off-road vehicles in accordance with the warning type. The warning type is set in accordance with targets to be warned. The warning type may be set such that the number of targets to be warned increases stepwisely. Specifically, the warning type may be set such that in addition to the warning output (Step S7) in the off-road vehicle 1, the warning information is also transmitted to other vehicles. For example, when the warning type is "1" (warning to other off-road vehicles; Yes in Step S8), the periphery recognition support unit 20 transmits the warning signal to other off-road vehicles (Step S9). In this case, the warning signal may be broadcasted to other off-road vehicles or may be transmitted to only the specific vehicles registered in Step S2. When the warning type is not "1" (No in Step S8), the warning signal is not transmitted to other off-road vehicles. A condition based on which the warning type becomes "1" may include a condition that it is determined that another off-road vehicle has entered the warning region L1 of the off-road vehicle 1.

The warning signal may be output to the server 41 in accordance with the warning type. For example, when the warning type is "2" (transmission to the server; Yes in Step S10), the periphery recognition support unit 20 transmits the warning signal to the server 41 through the network N (Step S11). The server 41 stores, as a log, information contained in the warning signal. Specifically, the server 41 stores, as the log, position information of a place where the warning is generated and information of the peripheral object that has satisfied the warning condition.

The information stored in the server 41 may be accessed by the periphery recognition support unit 20 or the mobile information terminal 40. A condition based on which the warning type becomes "2" may include a condition that it is determined that the fixed object has entered the warning region L2 of the off-road vehicle 1. By accumulating in the server 41 the warning information indicating the approach between the fixed object and the off-road vehicle 1, a position at which the approach between the fixed object and the off-road vehicle 1 frequently occurs can be specified by the accumulated information, and therefore, the accumulated information can be utilized to alert the driver. When the warning type is not "2" (No in Step S10), the warning signal is not transmitted to the server 41. Steps S8 and S9 may be omitted, or Steps S10 and S11 may be omitted. Or, Steps S8, S9, S10, and S11 may be omitted.

When the ECU 32 of the off-road vehicle 1 receives the warning signal from the periphery recognition support unit 20, the ECU 32 of the off-road vehicle 1 may suppress the output of the prime mover E of the off-road vehicle 1. The suppression of the output of the prime mover E may be control of reducing an upper limit of the traveling speed. The suppression of the output of the prime mover E may be control of reducing the rotational speed or torque of the prime mover E. The suppression of the output of the prime mover E may be control of reducing a required output by a predetermined ratio, the required output being determined in accordance with the detected value of the accelerator sensor 31. The suppression of the output of the prime mover E may be control of stopping the output of the prime mover E. The suppression of the output of the prime mover E may be control of activating a lock mechanism that mechanically restricts acceleration manipulation of an accelerator lever. The suppression of the output of the prime mover E may be executed immediately when the warning condition is satisfied. The suppression of the output of the prime mover E may be executed after a predetermined delay time has elapsed since the warning condition is satisfied. For example, the ECU 32 may start counting the predetermined delay time when the ECU 32 receives the warning signal, and after the completion of the counting, the ECU 32 may start the suppression of the output of the prime mover E.

Figure 13:
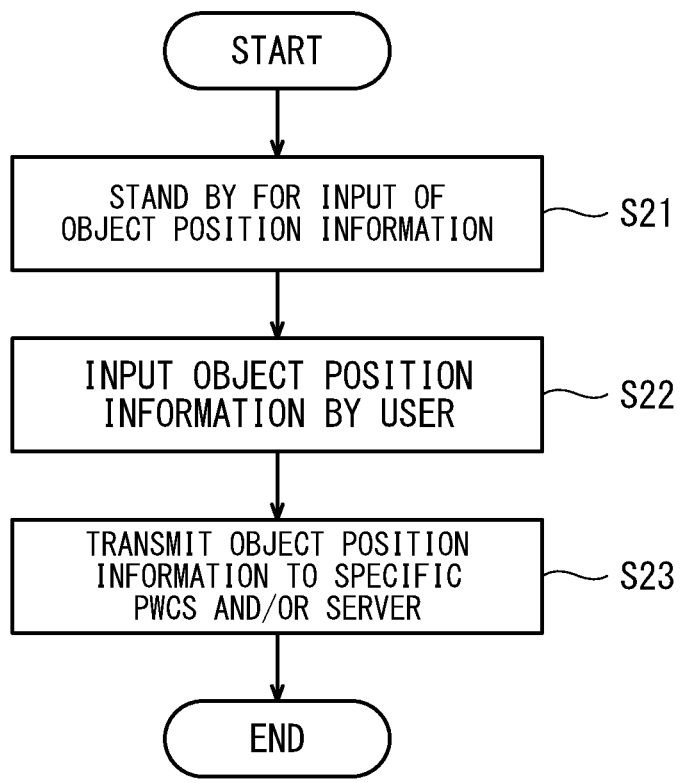
FIG. 13 is a flow chart showing object registration processing in the periphery recognition support system shown in FIG. 4.
Figure 14:
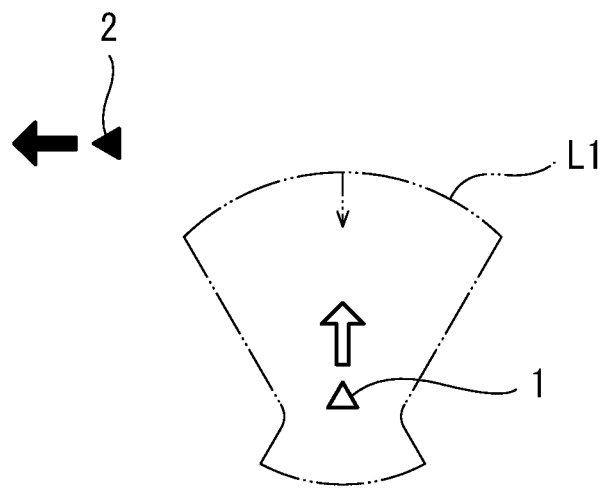
FIG. 14 is a schematic diagram for explaining a first modified example of the warning condition when the off-road vehicle is traveling.

FIG. 13 is a flow chart showing object registration processing in the periphery recognition support system 100 shown in FIG. 4. As shown in FIG. 13, the CPU 21 displays the user input screen image on the display 24 in accordance with predetermined input manipulation and stands by for the user's input of the object position information indicating the position of the peripheral object (Step S21). The user manipulates the user input interface 25 to input the object position information (Step S22). For example, the user inputs the object position information regarding the peripheral objects, such as obstacles and oases, for his/her and other people's future travel. The object position information may include not only the position of the peripheral object but also the name, detail information, and the like of the peripheral object.

The CPU 21 may transmit the input object position information to other off-road vehicles. The object position information may be transmitted to only the specific vehicles (Step S23). The CPU 21 may transmit the input object position information to the server 41. The server 41 stores, as a log, information contained in the object position information. The information stored in the server 41 may be accessed by the periphery recognition support unit 20 or the mobile information terminal 40. The functions shown in FIG. 13 may be omitted.

The warning condition may include a condition regarding a relative vector including the relative speed between the off-road vehicle 1 and the peripheral object and the relative movement direction between the off-road vehicle 1 and the peripheral object. Position related data may separately include a movement vector of the off-road vehicle 1 and a movement vector of the peripheral object. The warning condition may be a condition that: the relative movement direction between the off-road vehicle 1 and the peripheral object indicates that the off-road vehicle 1 and the peripheral object relatively move so as to approach each other; and the object distance is less than the threshold. The warning condition may be a condition that: the relative vector indicates that the off-road vehicle 1 and the peripheral object relatively move so as to approach each other, and the relative speed is a threshold or more; and the object distance is less than the threshold. The position related data may be such data as not to include one of the movement vector of the off-road vehicle 1 and the movement vector of the peripheral object but to include the other of the movement vector of the off-road vehicle 1 and the movement vector of the peripheral object.

The threshold of the object distance may change in accordance with a change in the relative vector including the relative movement direction between the off-road vehicle 1 and the peripheral object and the relative speed between the off-road vehicle 1 and the peripheral object. To be specific, the threshold of the object distance may increase as the relative vector changes such that the tendency of early approach between the off-road vehicle 1 and the peripheral object becomes strong. For example, the threshold of the object distance when the relative movement direction between the off-road vehicle 1 and the peripheral object indicates that the off-road vehicle 1 and the peripheral object approach each other may be made larger than the threshold of the object distance when the relative movement direction between the off-road vehicle 1 and the peripheral object indicates that the off-road vehicle 1 and the peripheral object move away from each other. For example, the threshold of the object distance when the relative speed between the off-road vehicle 1 and the peripheral object is high may be made larger than the threshold of the object distance when the relative speed between the off-road vehicle 1 and the peripheral object is low.

Figure 15:
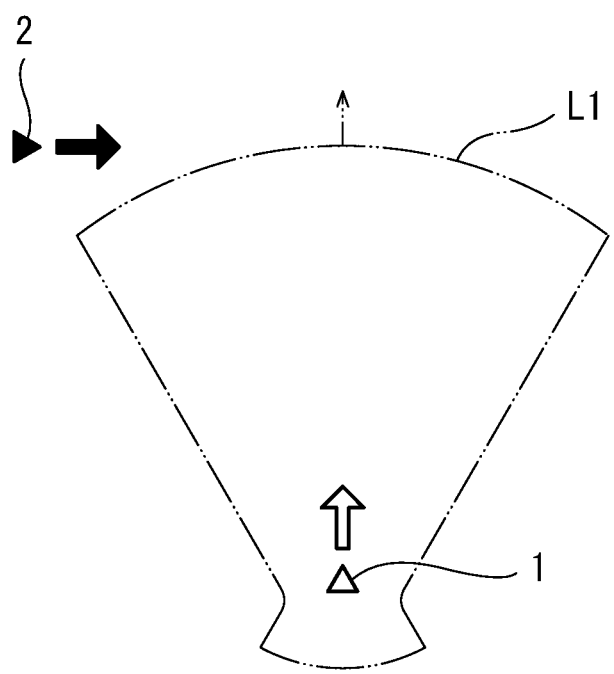
FIG. 15 is a schematic diagram for explaining the first modified example of the warning condition when the off-road vehicle is traveling.
Figure 16:
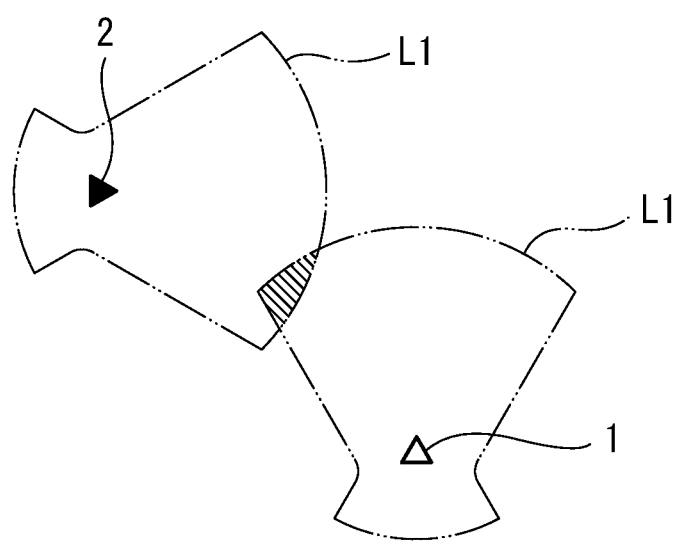
FIG. 16 is a schematic diagram for explaining a second modified example of the warning condition when the off-road vehicle is traveling.

For example, as shown in FIGS. 15 and 16, the warning region L1 based on the off-road vehicle 1 when the off-road vehicle 2 travels so as to approach the off-road vehicle 1 may be made smaller than the warning region L1 based on the off-road vehicle 1 when the off-road vehicle 2 travels so as to move away from the off-road vehicle 1. When the off-road vehicle 2 travels so as to approach the off-road vehicle 1, the warning region L1 may be made small as the relative speed between the off-road vehicle 1 and the off-road vehicle 2 increases. When the off-road vehicle 2 travels so as to move away from the off-road vehicle 1, the warning region L1 may be made large as the relative speed between the off-road vehicle 1 and the off-road vehicle 2 increases. The warning condition may be common regardless of the traveling speed and traveling direction of the off-road vehicle 1. The warning condition may be common without being changed in accordance with the type of the peripheral object.

FIG. 16 is a schematic diagram for explaining a second modified example of the warning condition when the off-road vehicle 1 is traveling. As shown in FIG. 16, when the warning region L1 based on the off-road vehicle 2 partially overlaps the warning region L1 based on the off-road vehicle 1, the periphery recognition support system 20 of the off-road vehicle 1 may determine that the warning condition is satisfied. To be specific, the outer edge of the warning region L1 based on the off-road vehicle 2 may be set as the peripheral object.

The warning condition may be changed in accordance with an ambient environment of the off-road vehicle 1. For example, when it is determined that the ambient environment of the off-road vehicle 1 is a low-visibility environment, such as an environment in which there are many obstacles, an environment in which it is a nighttime, or an environment in which there is a fog, the threshold of the object distance may be increased such that the warning condition is easily satisfied. Information of the ambient environment of the off-road vehicle 1 may be received by the periphery recognition support unit 20 through the network N or may be detected by a sensor of the periphery recognition support unit 20.

The periphery recognition support program may be partially or entirely executed by the mobile information terminal 40. The periphery recognition support program may be partially or entirely executed by the server 41. The periphery recognition support program may be partially or entirely executed by the ECU 32 mounted on the off-road vehicle 1. The periphery recognition support program may be subjected to distributed processing.

According to the above-described configuration, the warning signal is output when a predetermined warning condition regarding the position data indicating the position of the off-road vehicle 2 as the peripheral object is satisfied. Therefore, the convenience for the driver of the off-road vehicle 1 having a high degree of freedom of the traveling direction and a high degree of freedom of the traveling route improves.

Since whether or not the warning condition is satisfied is determined based on the position coordinates of the off-road vehicle 1 and the position coordinates of the off-road vehicle 2, the positional relation is easily recognized regardless of the direction of the off-road vehicle 1.

Since the position coordinates of the off-road vehicle 1 and the position coordinates of the off-road vehicle 2 are three-dimensional position coordinates, appropriate warning can be given also in consideration of height.

Since the off-road vehicle 2 is a movable body, and the position coordinates wirelessly transmitted from the off-road vehicle 2 are received, it is possible to prevent a case where the off-road vehicle 1 and the off-road vehicle 2 move to quickly approach each other.

Since the warning condition includes the condition that the object distance is less than the threshold, the off-road vehicle 1 can be prevented from approaching the off-road vehicle 2.

Since the threshold of the object distance differs depending on the relative speed between the off-road vehicle 1 and the off-road vehicle 2 or the relative movement direction between the off-road vehicle 1 and the off-road vehicle 2, undesired warning can be prevented, and the warning can be appropriately performed.

Since the threshold of the object distance differs depending on the ambient environment of the off-road vehicle 1, undesired warning can be prevented, and the warning can be appropriately performed.

Since whether or not the warning condition is satisfied is determined based on the relative speed between the off-road vehicle 1 and the off-road vehicle 2 or the relative movement direction between the off-road vehicle 1 and the off-road vehicle 2, a future distance between the off-road vehicle 1 and the off-road vehicle 2 can be predicted, and the warning signal can be then output. Thus, the approach of the off-road vehicle 1 to the off-road vehicle 2 can be suitably prevented.

Since the warning signal includes an instruction of making the display 24 display the mark M3 as a display image different from the normal display image, the driver of the off-road vehicle 1 can easily recognize on the display the peripheral object that has satisfied the warning condition. Thus, the convenience for the user improves.

Since the warning signal includes an instruction of suppressing the output of the power unit 19 of the off-road vehicle 1, the speed of the off-road vehicle 1 is automatically suppressed when the warning condition is satisfied. Thus, the driver of the off-road vehicle 1 can concentrate on traveling. For example, when the off-road vehicle 1 should travel at low speed, the driver of the off-road vehicle 1 does not have to pay attention to the speed. Thus, a driving burden can be reduced.

Since the warning signal including the position data of the peripheral object is transmitted to the server 41, the server 41 can receive the warning signals from the off-road vehicles and accumulate the warning signals. Therefore, the server 41 can provide the positions of various peripheral objects.

Since the warning signal is transmitted to the specific vehicle registered by the user's input, the warning information is transmitted only to limited people concerned (such as group members or group leaders). Thus, selective information provision can be performed.

The periphery recognition support unit 20 of the off-road vehicle 1 acquires the position information of the peripheral object by RF communication through the first transceiver 28. Therefore, even when the off-road vehicle 1 travels outside the radio wave transmission/reception range of the base station that is a fixed facility, the periphery recognition support unit 20 of the off-road vehicle 1 can acquire the position information of the peripheral object over a wide range.

The foregoing has described a case where the periphery recognition support system 100 includes the periphery recognition support unit 20 including a casing in which components necessary for the support of the periphery recognition are housed. However, the above embodiment is not limited to this. For example, the components necessary for the support of the periphery recognition may be arranged separately from each other and may be electrically connected to each other so as to be communicable with each other. The first transceiver 28 and the own position sensor 27 may be arranged at a vehicle body position suitable for radio wave reception. The display 24 may be arranged at a vehicle body position that can be visually confirmed by the driver in a driving posture. The CPU 21 and the memories 22 and 23 may be disposed in a waterproof space in the vehicle body. As above, the components necessary for the support of the periphery recognition may be arranged at positions suitable for the respective components.

Part of the periphery recognition support unit 20 may be included in the vehicle in advance as standard equipment. For example, an own position sensor included in the vehicle as the standard equipment may be used as the own position sensor 27. Similarly, a meter included in the vehicle as the standard equipment may be used as the display 24. Since the periphery recognition support system 100 is realized by utilizing the components included in the vehicle as the standard equipment, the number of components of the vehicle which are applied to the periphery recognition support system 100 can be reduced.

The periphery recognition support unit 20 may be attachable to and detachable from the vehicle as an accessory component. With this, even when the periphery recognition support unit 20 malfunctions, the periphery recognition support unit 20 can be easily repaired or replaced. Since the periphery recognition support unit 20 is the accessory component, the vehicle body structure can be made common between when the periphery recognition support system 100 is not required and when it is required.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

As above, the embodiments have been described as examples of the technology disclosed in the present application. However, the technology in the present disclosure is not limited to those and is also applicable to embodiments in which modifications, replacements, additions, omissions and the like are suitably made. Moreover, a new embodiment may be prepared by combining the components described in the above embodiments. For example, some of components or methods in an embodiment may be applied to another embodiment, and some of components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A periphery recognition support system for an off-road vehicle,
the periphery recognition support system comprising processing circuitry configured to:
receive position data indicating a position of at least one peripheral object around an off-road vehicle;
determine based on the position data whether or not a predetermined warning condition is satisfied;
output a predetermined warning signal including a warning type when it is determined that the predetermined warning condition is satisfied; and
determine whether the warning type is a first type or a second type, wherein
the predetermined warning condition indicates approach between the off-road vehicle and the at least one peripheral object; and
outputting the warning signal includes transmitting the warning signal to another off-road vehicle in response to determining that the warning type is the first type, and transmitting the warning signal to a server in response to determining that the warning type is the second type.

2. The periphery recognition support system according to claim 1, wherein:
the processing circuitry is further configured to display on a display a mark indicating the position of the at least one peripheral object; and
the predetermined warning signal includes an instruction of displaying the mark on the display as a display image different from a normal display image.

3. The periphery recognition support system according to claim 1, wherein:
the processing circuitry is further configured to receive a user's input of an instruction of registering one or more other off-road vehicles as specific vehicles; and
outputting the predetermined warning signal includes transmitting the predetermined warning signal to the specific vehicles.

4. The periphery recognition support system according to claim 1, further comprising a first transceiver that is mounted on the off-road vehicle and is wirelessly communicable with a second transceiver mounted on another vehicle that is one of the at least one peripheral object, wherein:
the first transceiver receives from the second transceiver the position data including position coordinates of the another vehicle; and the processing circuitry is further configured to display, based on the position coordinates of the another vehicle received by the first transceiver, on a display a display image indicating the another vehicle.

5. A periphery recognition support method for an off-road vehicle, the periphery recognition support method comprising:

receiving position data by processing circuitry, the position data indicating a position of at least one peripheral object around an off-road vehicle;

determining by the processing circuitry based on the position data whether or not a predetermined warning condition is satisfied;

when it is determined that the predetermined warning condition is satisfied, outputting a predetermined warning signal including a warning type by the processing circuitry; and determine whether the warning type is a first type or a second type, wherein the predetermined warning condition indicates approach between the off-road vehicle and the at least one peripheral object; and outputting the warning signal includes transmitting the warning signal to another off-road vehicle in response to determining that the warning type is the first type, and transmitting the warning signal to a server in response to determining that the warning type is the second type.

6. The periphery recognition support system according to claim 1, wherein:

outputting the predetermined warning signal includes outputting the predetermined warning signal to a display; and the processing circuitry is further configured to display on the display a warning display image such that the warning display image is changed in accordance with a type of the at least one peripheral object that has satisfied the predetermined warning condition.

7. The periphery recognition support system according to claim 1, wherein:

at least one virtual regulated area that corresponds to an intangible object includes a speed restricted area and a travel prohibited area; and the predetermined warning condition differs depending on whether the at least one peripheral object that has satisfied the predetermined warning condition is the at least one virtual regulated area or not.

8. The periphery recognition support system according to claim 1, wherein:

the at least one peripheral object is a movable body; and when a difference between the off-road vehicle and the movable body is less than a predetermined threshold with respect to latitude and longitude and when the difference between the height of the off-road vehicle and the height of the movable body exceeds a predetermined value with respect to altitude, the warning condition is not satisfied.

9. The periphery recognition support system according to claim 1, wherein the warning type is set in accordance with the at least one peripheral object.

10. The periphery recognition support system according to claim 1, wherein:

the off-road vehicle is a first off-road vehicle;

a first condition based on which the warning type becomes the first type includes a condition that it is determined that a second off-road vehicle as the at least one peripheral object has entered a first warning region of the first off-road vehicle; and a second condition based on which the warning type becomes the second type includes a condition that it is determined that a fixed object as the at least one peripheral object has entered a second warning region of the first off-road vehicle.

11. The periphery recognition support system according to claim 1, wherein transmitting the warning signal to the server includes transmitting object position information indicating a position of the at least one peripheral object that has satisfied the warning condition, an identification information of the at least one peripheral object that has satisfied the warning condition, and identification information of the periphery recognition support system.

12. The periphery recognition support system according to claim 1, wherein when it is determined that an ambient environment of the off-road vehicle is a predetermined low-visibility environment, the predetermined warning condition is set so as to be more easily satisfied than when it is determined that an ambient environment of the off-road vehicle is not the predetermined low-visibility environment.

13. The periphery recognition support system according to claim 12, wherein the predetermined low-visibility environment includes an environment in which there are many obstacles, an environment in which it is nighttime, or an environment in which there is fog.

14. The periphery recognition support system according to claim 1, wherein the processing circuitry is further configured to display on a display a warning display image such that a degree of emphasis of the warning display image be increased continuously or stepwisely as the at least one peripheral object that has entered a predetermined warning region further approaches the off-road vehicle.

15. The periphery recognition support system according to claim 1, wherein the processing circuitry is further configured to display on a display a warning display image such that a degree of emphasis of the warning display image when the at least one peripheral object that has satisfied the warning condition is a movable object is higher than that of the warning display image when the at least one peripheral object that has satisfied the warning condition is a fixed object.

16. The periphery recognition support system according to claim 1, wherein the server stores, as a log, position information of a place where the warning signal is generated and information of the at least one peripheral object that has satisfied the warning condition.

* * * * *